United States Patent [19]

Phillips et al.

[11] 3,751,900

[45] Aug. 14, 1973

[54] REMOTE TIME TRANSFER SYSTEM WITH EPOCH PULSE

[75] Inventors: David H. Phillips; Ruth E. Phillips, both of Accokeek, Md.

[73] Assignee: The United States of America as represented by the Secretary of the Navy, Washington, D.C.

[22] Filed: Apr. 23, 1971

[21] Appl. No.: 136,779

[52] U.S. Cl. ............ 58/24 R, 340/147 SY, 343/225
[51] Int. Cl. ........................ G04c 13/02, H04b 7/00
[58] Field of Search ........................58/24–26, 35 W; 340/147 SY, 167; 343/225

[56] References Cited

UNITED STATES PATENTS

| | | | |
|---|---|---|---|
| 3,541,552 | 11/1970 | Carlson | 58/24 R |
| 3,472,019 | 10/1969 | Webb | 58/24 R |
| 3,128,465 | 4/1964 | Brilliant | 58/24 R |

*Primary Examiner*—Richard B. Wilkinson
*Assistant Examiner*—Edith C. Simmons Jackmon
*Attorney*—R. S. Sciascia, Arthur L. Branning and Philip Schneider

[57] ABSTRACT

A passive method and equipment for synchronizing time systems, atomic or precision clocks, by transferring both time and frequency information. The time and frequency information are transmitted by a master station to remote stations which record the phase difference between the remote station's clock and that of the master thereby giving a very accurate measure of the time deviation between the station when the transmission delays are removed.

5 Claims, 3 Drawing Figures

INVENTORS
RUTH E. PHILLIPS
DAVID H. PHILLIPS

ATTORNEY

Patented Aug. 14, 1973 3,751,900

2 Sheets-Sheet 2

INVENTORS
RUTH E. PHILLIPS
DAVID H. PHILLIPS

ATTORNEY

REMOTE TIME TRANSFER SYSTEM WITH EPOCH PULSE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is concerned with the accurate transfer of time from one clock to another clock located elsewhere. This problem of the timing of widely separated clocks has become more of a problem with the wide spread use of portable atomic clocks, which can be used to set the time at each location, that is desired to be synchronized with the portable atomic clock. The atomic clock though highly accurate does drift. Thus, it is necessary that when a clock is being synchronized with a portable atomic clock that the portable atomic clock be returned to be compared with the original master with which the portable clock was timed. This transporting of clocks is very time consuming and very expensive. Thus, it is desirable that some means be used which is less expensive, fast, more accurate and more reliable than the portable clock. The methods suggested are two-way radio transmission between the master and remote clocks, one way radio transmission between the master and remote clocks, or transmission by some signal source which is received by the master and all the remote clocks wherein a comparasion of the data is made to determine the time at which the remote clocks made this reception.

An obvious problem arises when two-way transmission is used between a master and a plurality of remote clocks. There would be an extremely high number of unnecessary return transmissions from the remote clock stations which in a worldwide system could be extremely complicated with each remote clock making these return transmissions. Thus, the inventors have concluded that the use of one-way transmission or the use of a separate signal source prove to be the most desirable for use in a world wide system. Attempts have been made at various types of time transfer but none have achieved the accuracy and simplicity of the present invention.

SUMMARY OF THE INVENTION

The present invention is a new and novel passive system of transferring time and frequency information with a high degree of accuracy by accurately recording the occurrence of an event received at two different locations and comparing the time of occurrence of the event by the two different locations with each other. Should one of the stations be a master clock, that is, one which decides what the time will be, such as the U. S. Naval Observatory which sets the time standard in the United States, then the time difference between the remote and the master can be determined as the exact time of the occurrence is determined for the master by subtracting out transmission delays from the source, i.e., known range and equipment delays. If the same is done for the remote station the exact difference can be determined between the clocks.

OBJECTS OF THE INVENTION

It is therefore an object of the invention to provide an improved system for time transfer.

Another object is the provision for use of one-way radio transmission to provide an accurate time transfer system.

Yet another object is the use of a separate signal source which transmits time information to both master and remote stations both of which are tied together by computer.

Still a further object is the use of a master station which transmits to remote stations and provides for accurate time transfer.

DESCRIPTION OF THE PREFERRED EMBODIMENT

Figure 1:
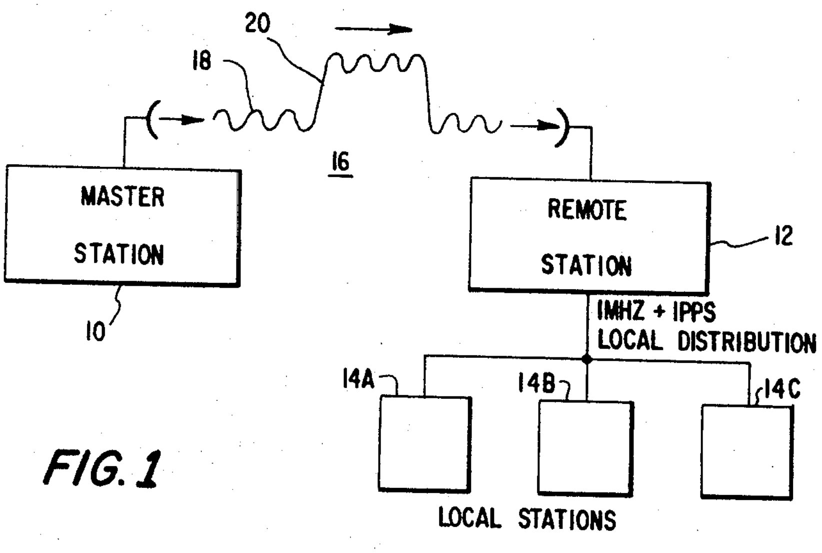
FIG. 1 shows one-way transmission between a master and a remote station.

FIG. 1 shows a microwave passive time transfer system for providing time and phase information to remote stations so that these remote stations can stay on time with the master. A master station 10 transmits time and phase information using an FM transmitter to remote stations, only one of which 12 is shown. The remote station receives the information 16 which is comprised of a one pulse per second, Tick 20 and phase information 18, at 1MHz which is used to keep the remote station on time and is, further, coupled by cable to other local stations 14A, 14B and 14C to provide them with time and phase information. The remote stations and local stations are normally set on time entirely by a traveling atomic clock and there after the 1pps Tick and the phase information are used to keep the remote and local stations on time as will be explained below.

In the case of a single remote station the flow of information may be reversed if phase difference information between local and remote standards is also sent and utilized at the master station. Thus, the remote standard becomes the transfer standard.

Figure 2:
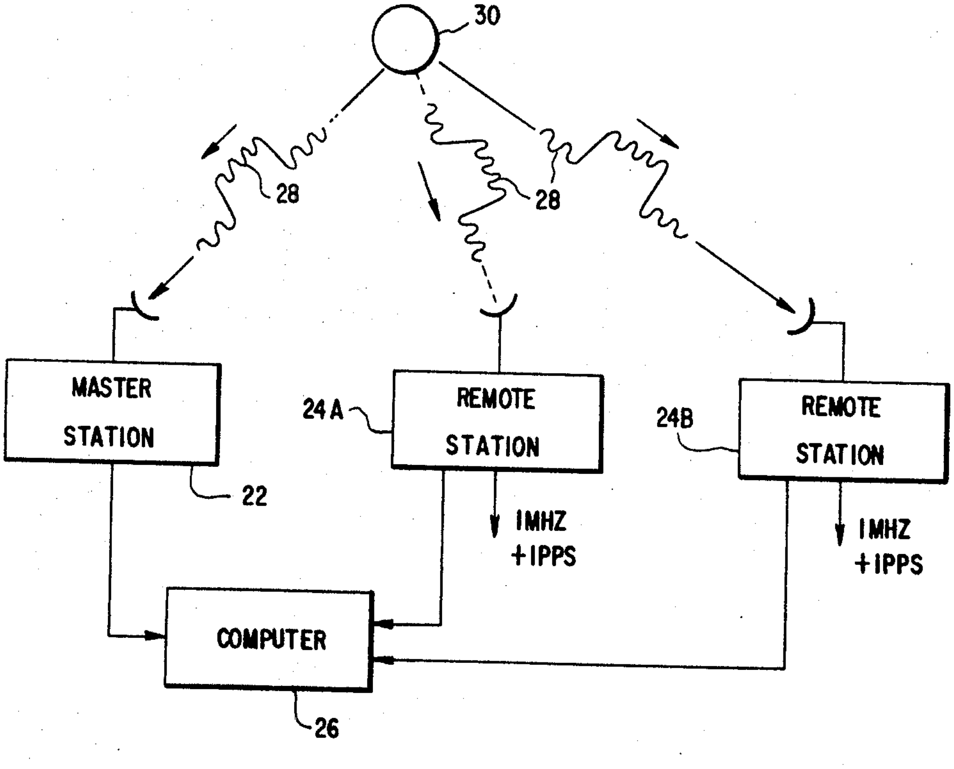
FIG. 2 shows one-way transmission between a source of time information and the master, and remote stations to be synchronized.

FIG. 2 is a second embodiment which employs a separate signal source 30 as a transfer standard such as a satellite which contains a clock which generates the 1pps tick and phase information. This need not be a highly accurate clock such as would be used in a master station, but merely be fairly reliable in operation. What is required from the clock in source 30 is that it keep running and transmitting the information 28. The time information 28 is received by all remote stations and the master. Each of the stations 24 employs the same equipment as does the master 22. In this embodiment each station, including the master, records the phase compared to that station's own generated signal, at the time (the time that that particular station's clock reads) of receipt of the leading edge of the 1pps tick. This phase information and the time of receipt are sent to a computer 26 which subtracts out the transmission delays, i.e., all these delays are accurately known, such as range and equipment delay. With these delays removed the recorded phase of each station is compared with that recorded by the master 22 and the difference in phase of the 1MHz signals indicates the error in the remote stations clock which is sent back to the remote station so that the station may adjust its clock for drift to coincide with the master's. As in FIG. 1, the remote stations could be connected to local stations by cable and these local stations would be connected into the computer 26 and operate in the same manner as the remote stations 24 in computing their own clock error. Station 12, of FIG. 1, when used with the computer connections of FIG. 2 could be the transfer standard.

Again as in the previously discussed system the clocks are initially put on time by a traveling atomic clock. Thus, the stations all have the same time to the same second.

As is a problem with most highly accurate clocks (such as atomic clocks) the problem is to get each clock to read the same second in time, at exactly the same time as all other clocks. This is the purpose of this invention. The phase information is used to maintain the remote clocks and local clocks to within the nanosecond range and higher as each remote and local station has a precision clock which generates a 1MHz signal for comparison with that of the master station's 1MHz signal. Of course, higher frequencies could by used for more accurate timing.

Figure 3:
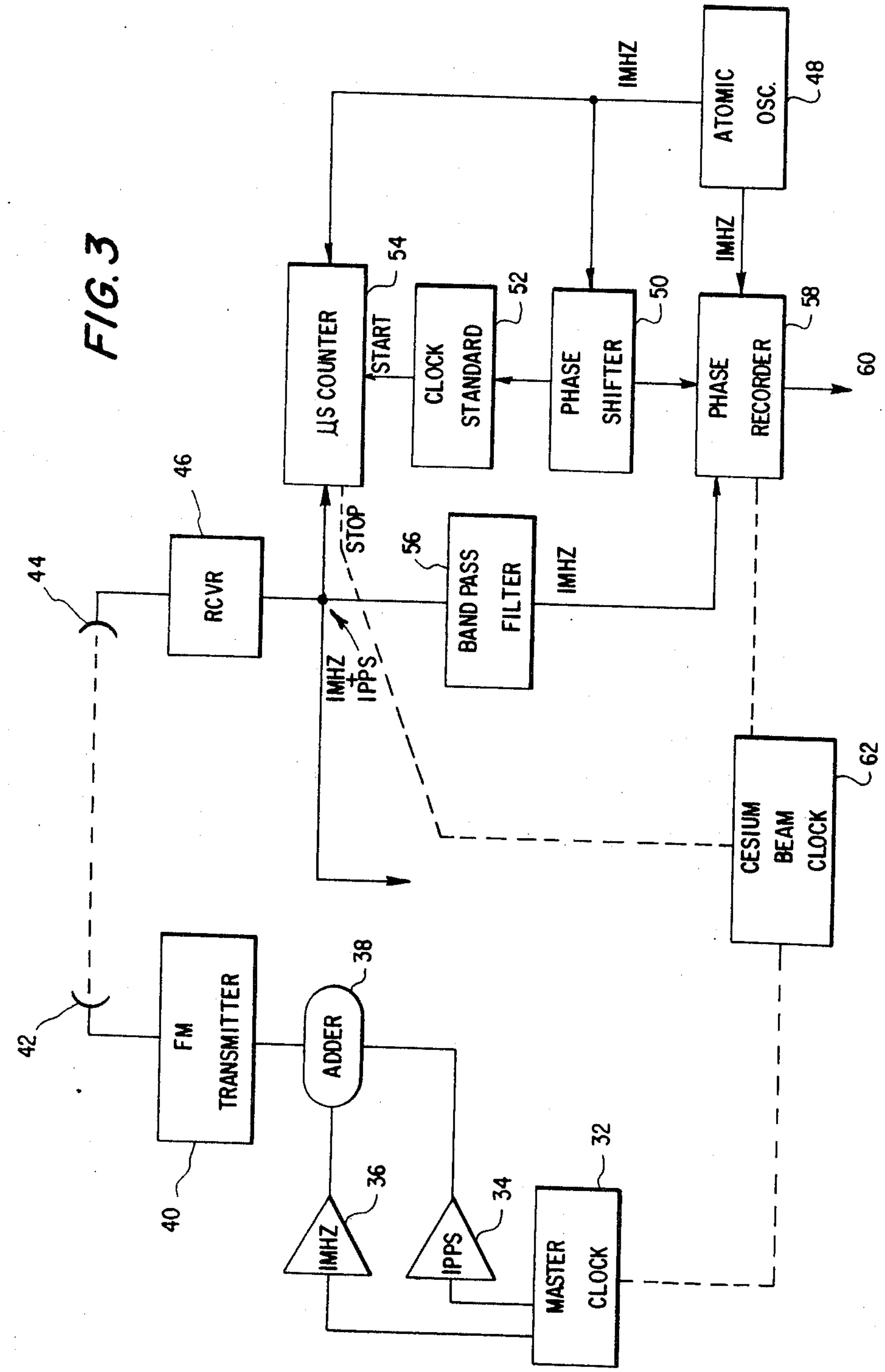
FIG. 3 shows the typical master and remote stations used in FIG. 1.

Now referring to FIG. 3 which shows the equipment used in the system of FIG. 1, master clock 32 generates a 1pps tick and a 1MHz signal which are amplified by amplifiers 34 and 36, respectively, and algebraically summed by adder 38. The summed output is then transmitted by an FM transmitter 40 and received by receiver 46 of a remote station where the received signal is FM demodulated providing a receiver output of 1MHz added to the 1pps tick, in the manner shown in FIG. 1. The atomic oscillator 48 is the primary reference for the station clock. This primary reference need not be atomic but could be a precision or phase locked oscillator. The oscillator 48 generates a 1MHz reference output which is fed to two channel phase recorder 58, to a microsecond counter 54 and to a phase shifter 50. The shifted 1MHz output of the phase shifter 50 is fed to a two channel phase recorder 58 and to the clock standard 52. The clock standard 52 is synchronized with the 1MHz from the phase shifter 50 and supplies a 1pps tick output to start the microsecond counter 54. The counter 54 counts the 1MHz output of the oscillator 48 thereby giving an indication of the number of microseconds which passed since the clock standard tick started. The leading edge of the received tick from the master causes the counter 54 to stop thereby giving a reading of the exact number of microseconds to the nanosecond range that have passed since the tick of clock standard 52 which, when the clock standard 52 is on time with the master, will be equal to the transmission delay time. Therefore, as the transmission delay time is known the phase shifter can be used to finely adjust the standard 52 to be exactly on time with the master. The received signal output from the receiver 46 is filtered by filter 56 to produce a pure sine wave at 1MHz which is connected to the two channel phase recorder 58. The phase recorder 58 has two channels, one compares the phase of received signal from filter 56 with the output of the atomic oscillator 48, while the other channel compares the shifted phase from shifter 50 with output of the atomic oscillator 48. The system allows for excellent phase resolution into the nansecond range. The phase differences are recorded and serve as a record of the phase difference between the atomic oscillator and the master atomic oscillator. The shifted phase difference is recorded for a history of the phase shift. The recorder 58 could be multichannel and record other local clock phases.

The system is set up on time by a traveling clock such as cesium beam clock 62 which is timed at the master and carried to the remote stations and compared with each of them as shown in FIG. 3. With each remote and local station timed by the traveling clock the clock may be kept on time using the received tick and phase information.

In the system employing a separate signal source 30, as in FIG. 2, each of the stations, master, remote and local, will be similar to the remote station portion of FIG. 3, except for the local which has no receiver but gets cabled information from the remote. But as mentioned above, as the source 30 is not a master and not necessarily accurate, therefore, the timing information transmitted will not be accurate; i.e., on time with the master. Thus, the stations all record their phase differences at the time of receipt of the tick and send this information to the computer which subtracts out the transmission delay and knowing what the master clock read at the time of receipt the remote stations can set their clocks to the correct time.

The local stations are identical to the remote stations with the exception that they receive their information by cable from the receiver 4 of a remote station.

Thus, it is seen that a new and novel passive system of transferring time and frequency information with a high degree of accuracy, and a very low signal-to-noise ratio by using microwave techniques and line of sight transmission to avoid multipath problems which occur in low frequency systems has been disclosed.

Obviously many modifications and variations of the present invention are possible in the light of the above teachings. It is therefore to be understood that within the scope of the appended claims the invention may be practiced otherwise than as specifically described.

What is claimed is:

1. A one way passive time transfer system having at least one master clock and at least one remote clock to be synchronized with said master clock comprising:

a master clock having a high frequency stable output signal and a periodic low frequency tick signal;

adder means for combining said high frequency signal with said tick signal to produce a modulated signal;

means for communicating said modulated signal to at least one of said remote clocks;

phase recording means for comparing the phase of said signal communicated to said remote clock with a similar signal produced by said remote clock to indicate the time difference between said remote and master clocks;

phase shifter means for shifting the phase of said remote clock to correspond to said master clock.

2. The one way passive time transfer system of claim 1 further including:

counter means for detecting the transmission delay time between said master and remote clocks by counting the delay time between said tick signal produced by said remote clock and said tick signal communicated to said remote clock whereby said detected transmission delay time is used for phase shift synchronization when shifting said phase shifter means to synchronize said master and remote clocks.

3. A passive time transfer system having at least one master timing station and at least one remote station to be synchronized with said master timing station;

communication means for transmitting synchronizing signals; and providing a transfer standard;

means for receiving said synchronizing signals at said remote station and at said master timing station;

means for detecting the phase of said received synchronizing signals as compared with the phase of a locally generated reference signal;

means for adjusting the phase of said reference signal;

clock means coupled to the adjusted phase of said reference signal for providing a time output which is approximately equal to the time of said master timing station.

4. The passive time transfer system of claim 3, wherein;

said clock means is coupled to a counter which begins recording the passing time upon receipt of a pulse from said clock;

said synchronizing signal being coupled to said counter to stop the counter upon receipt of a synchronizing pulse of said synchronizing signal such that when the remote clock is on time with said master timing station said counter will indicate the exact transmission time delay between said stations.

5. The passive time transfer system of claim 3, wherein each of said stations, master and remote, are coupled to a computer means;

said computer means for subtracting out the transmission delay of the synchronizing signal from said communication means for each station and compares the phase data of the master timing station with each remote station;

thereby allowing each station to know the exact time that that station's clock should have read upon the receipt of the synchronizing signal.

* * * * *